Jan. 9, 1940. R. R. CLARK ET AL 2,186,009
POULTRY CAGE
Filed June 21, 1938 13 Sheets-Sheet 5
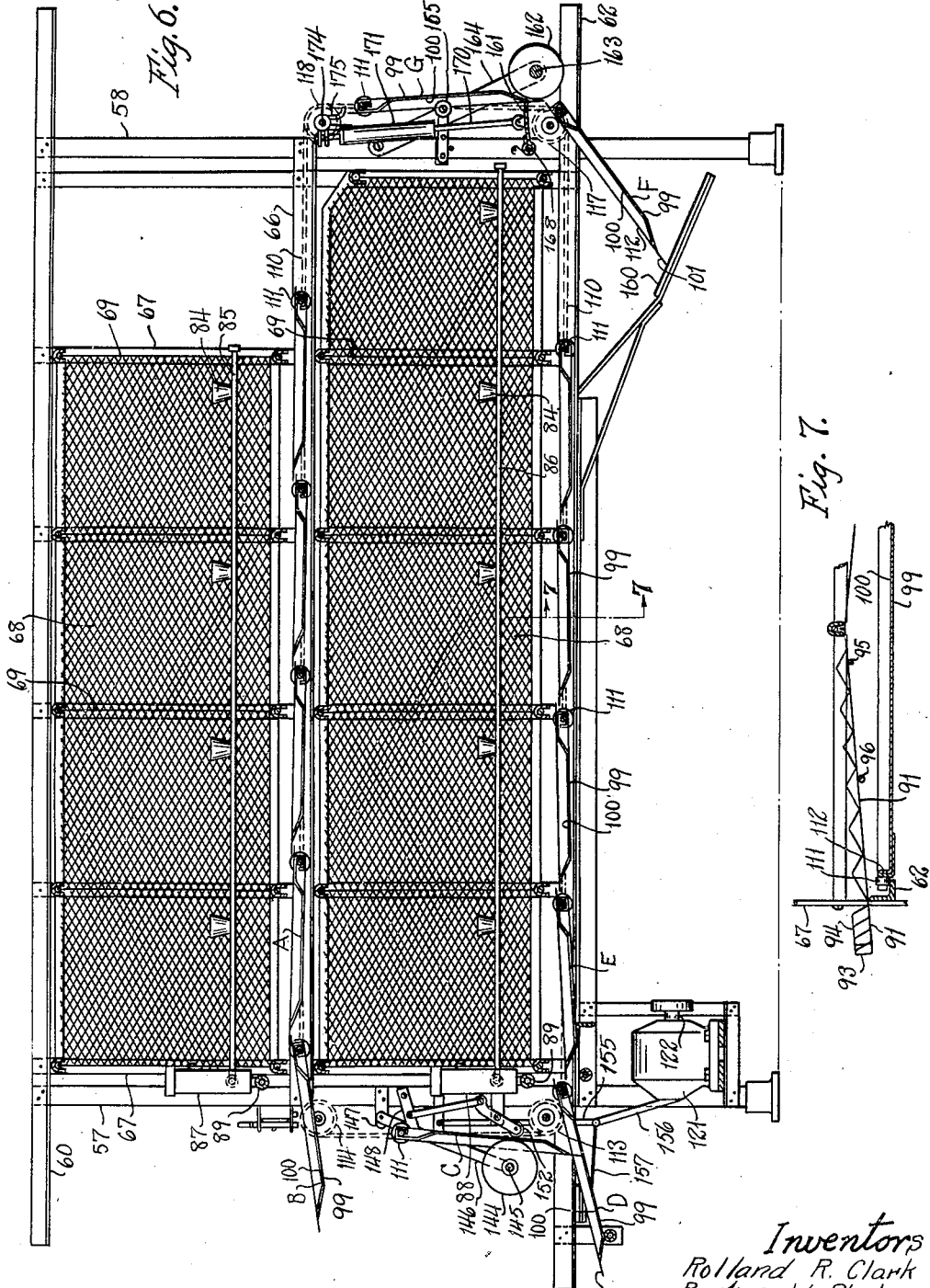
Inventors
Rolland R. Clark
Burton W. Phelps
By Seymour Earle Nichols
Attorneys Jan. 9, 1940.  R. R. CLARK ET AL  2,186,009
POULTRY CAGE
Filed June 21, 1938   13 Sheets-Sheet 6
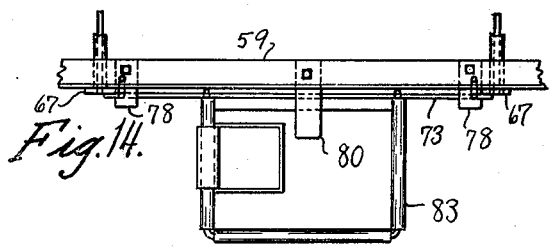
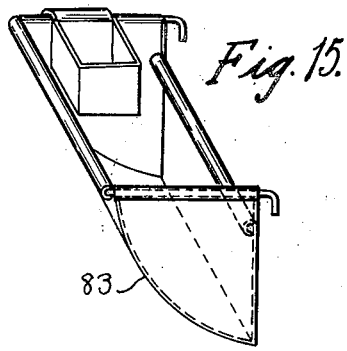
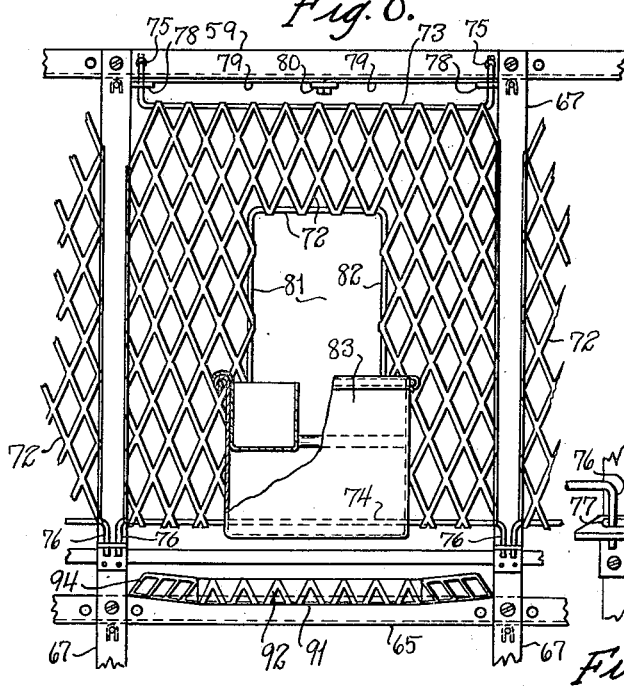
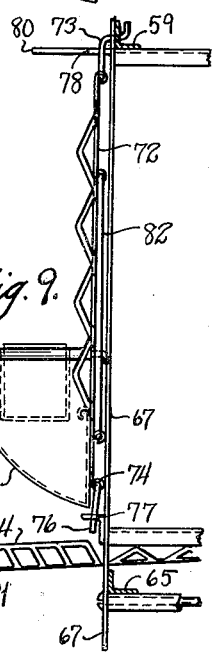
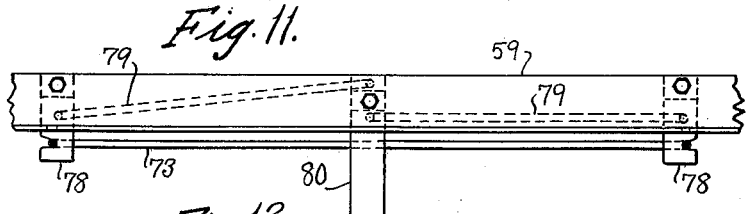
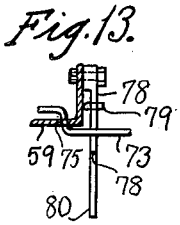
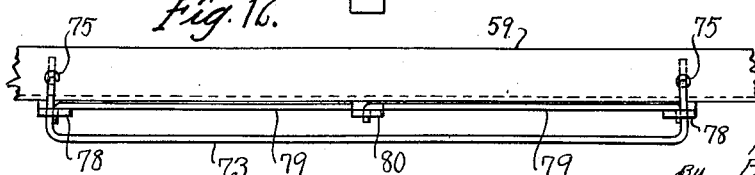
Inventors
Rolland R. Clark
Burton W. Phelps
by Seymour Earle Nichols
Attorneys

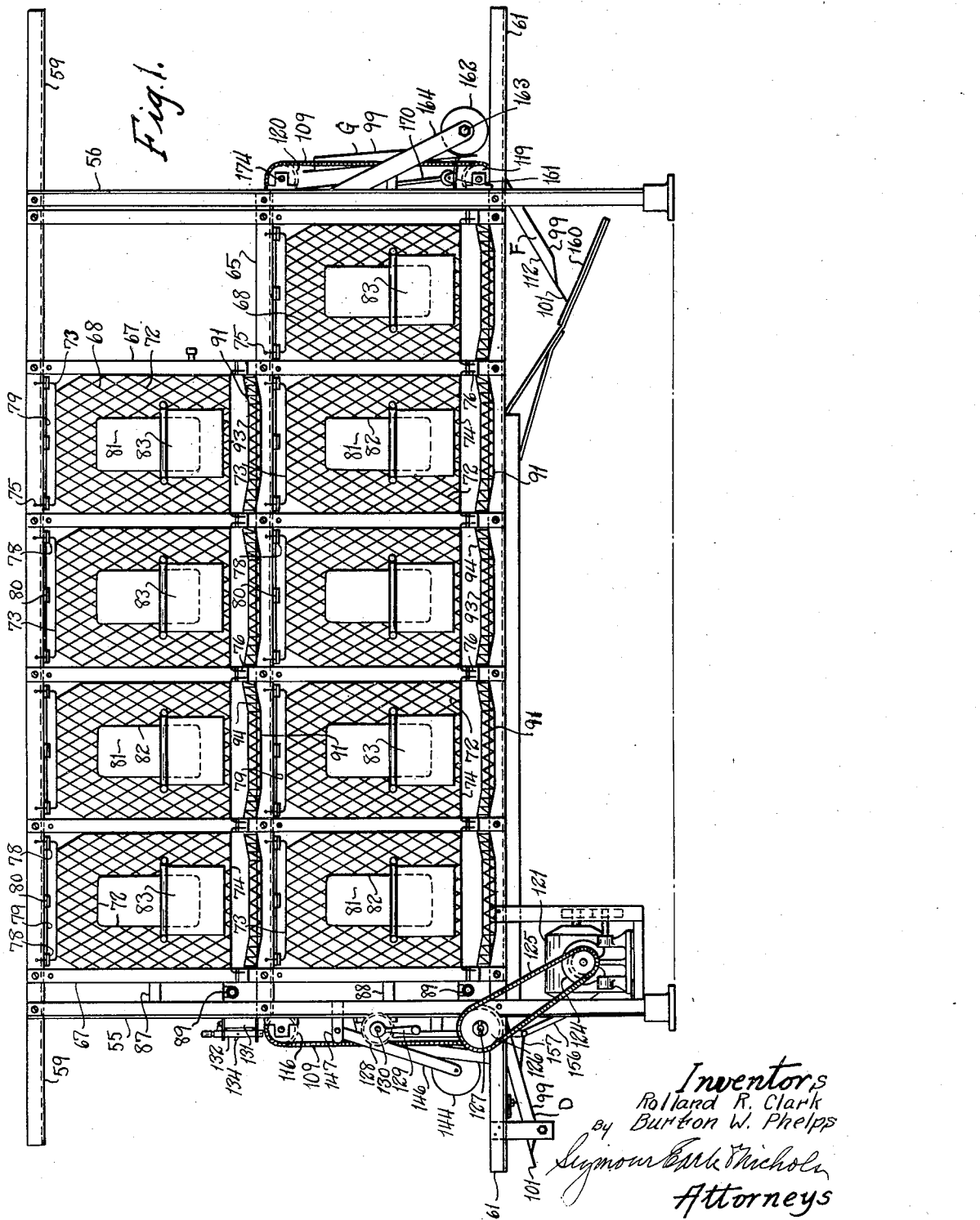

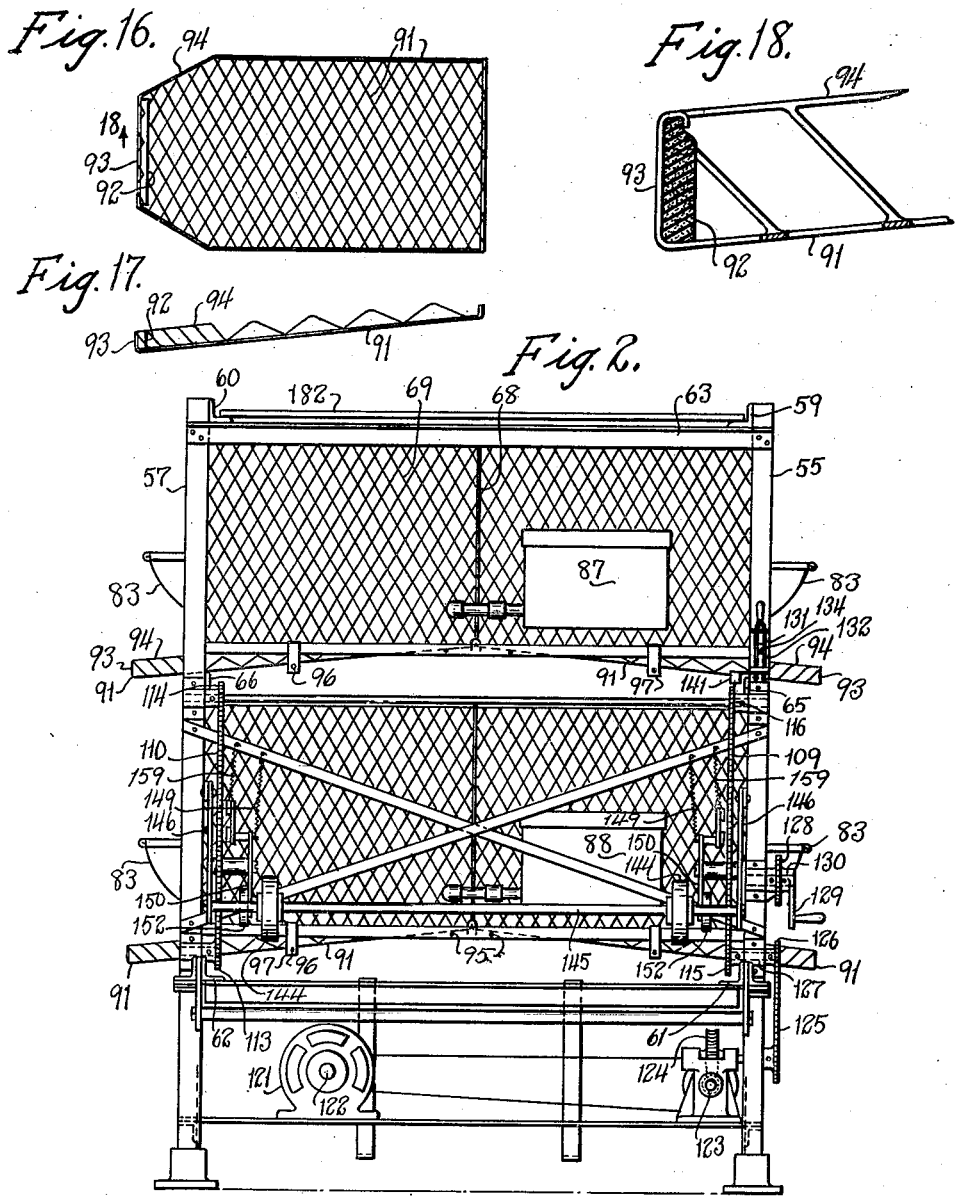

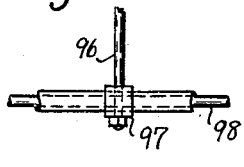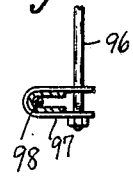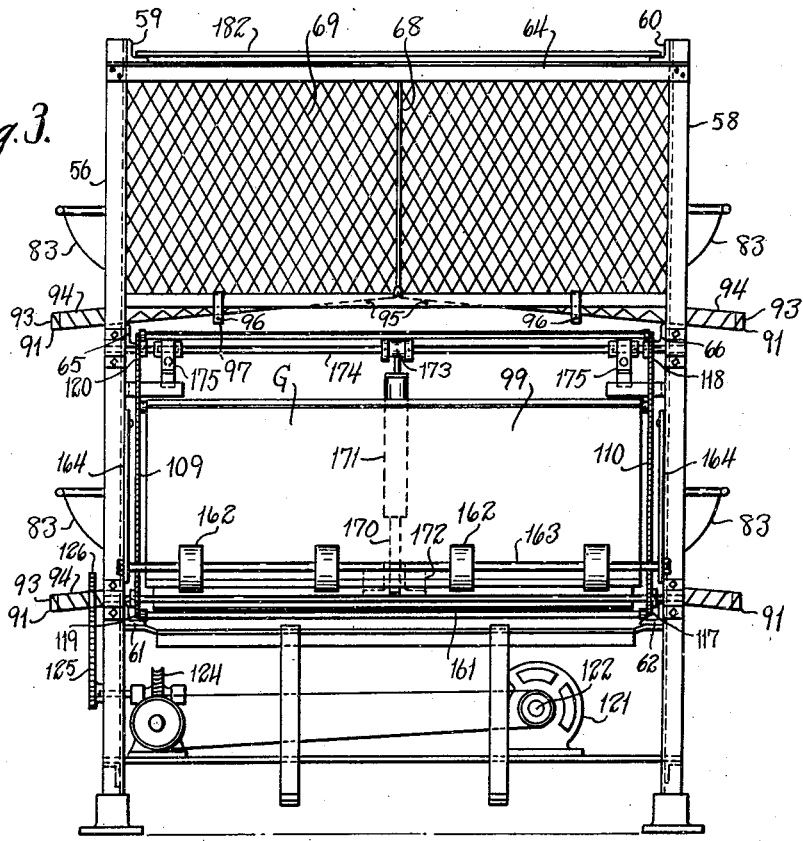

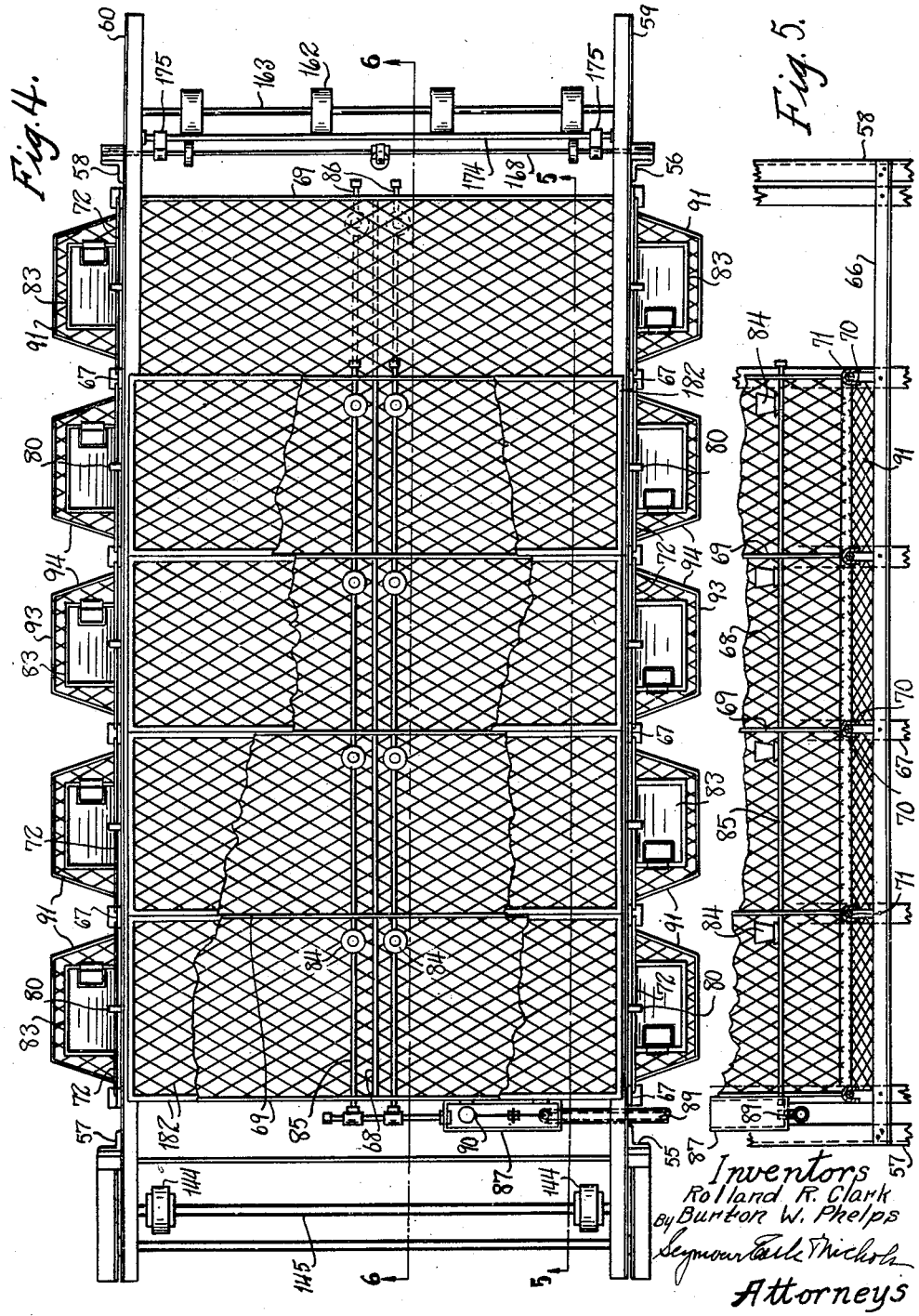

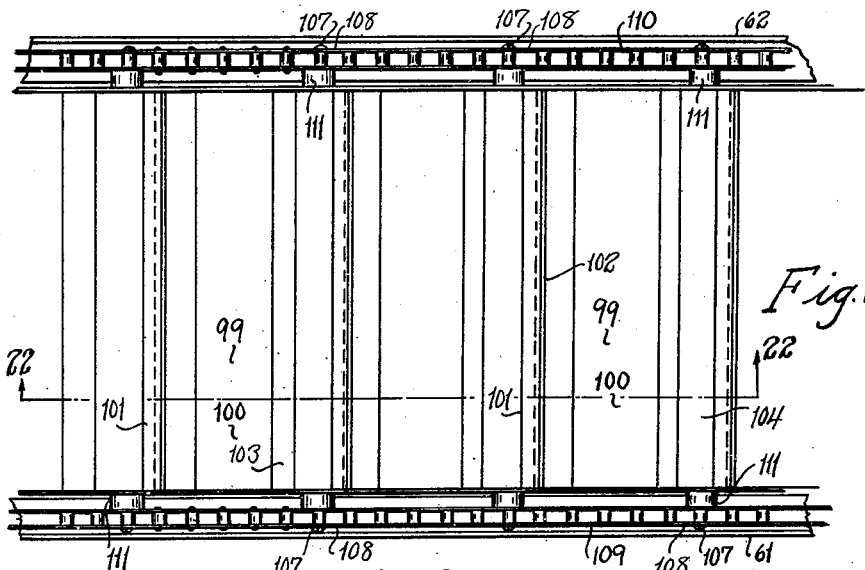
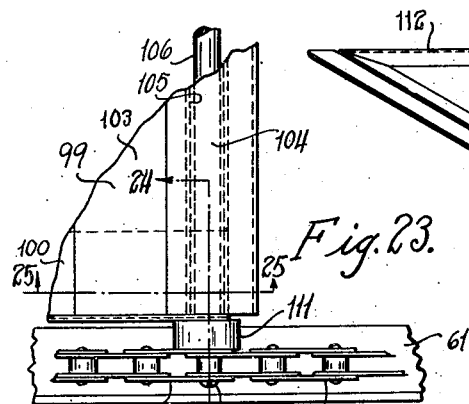
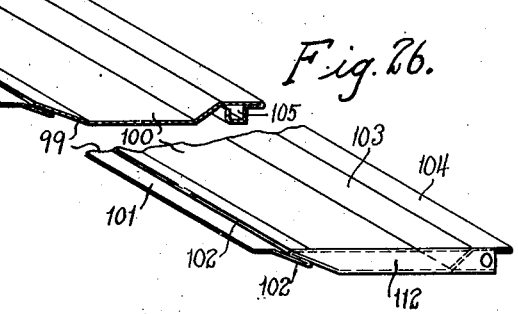
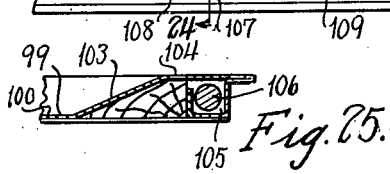
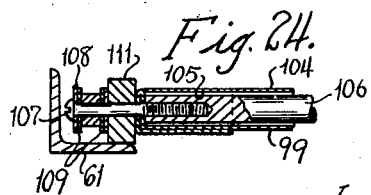

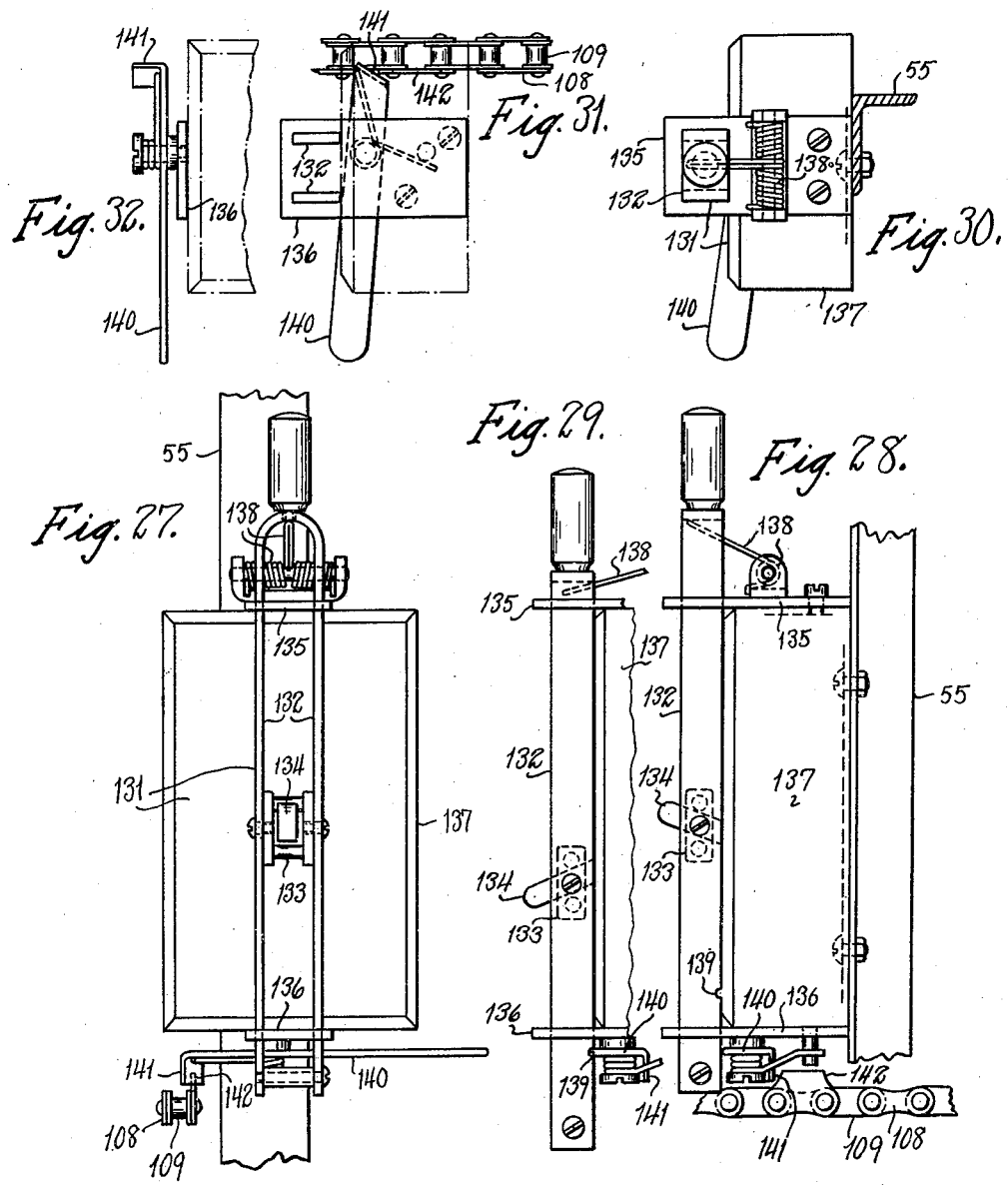

Jan. 9, 1940.    R. R. CLARK ET AL    2,186,009
POULTRY CAGE
Filed June 21, 1938    13 Sheets-Sheet 9

Inventors
Rolland R. Clark
Burton W. Phelps
By Seymour Earl Nichols
Attorneys

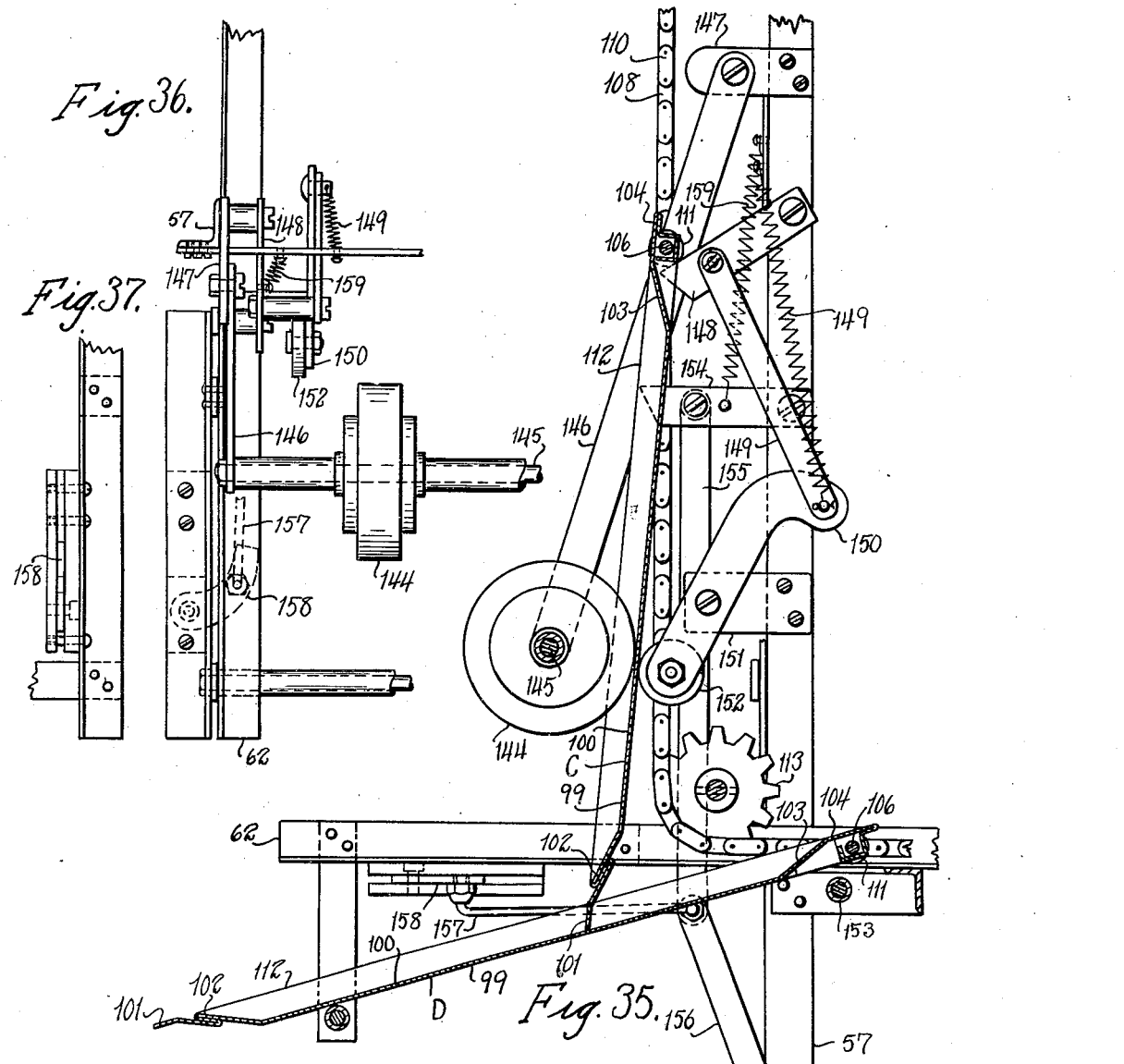

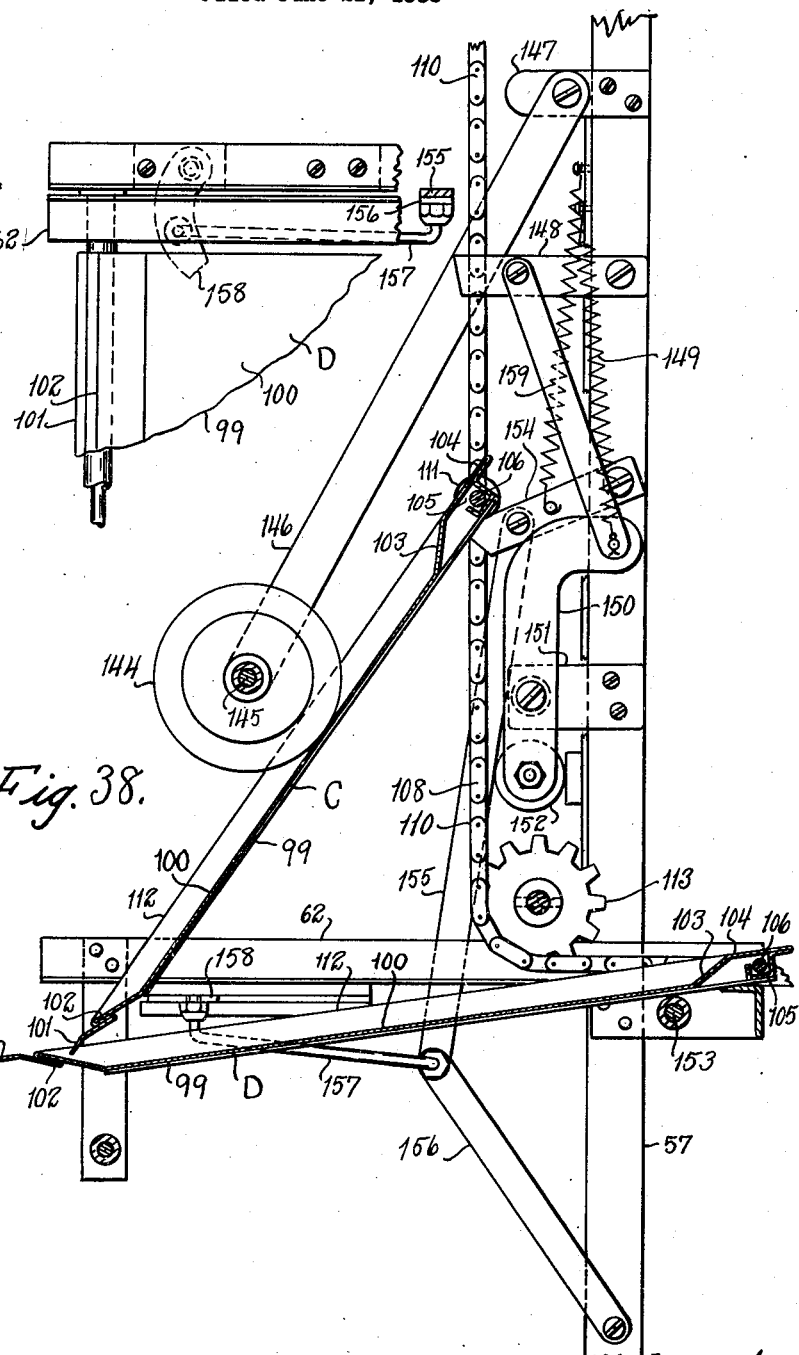

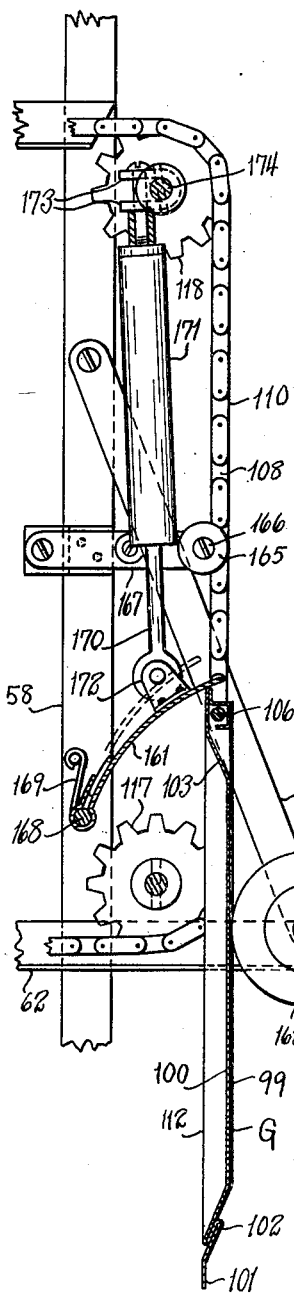
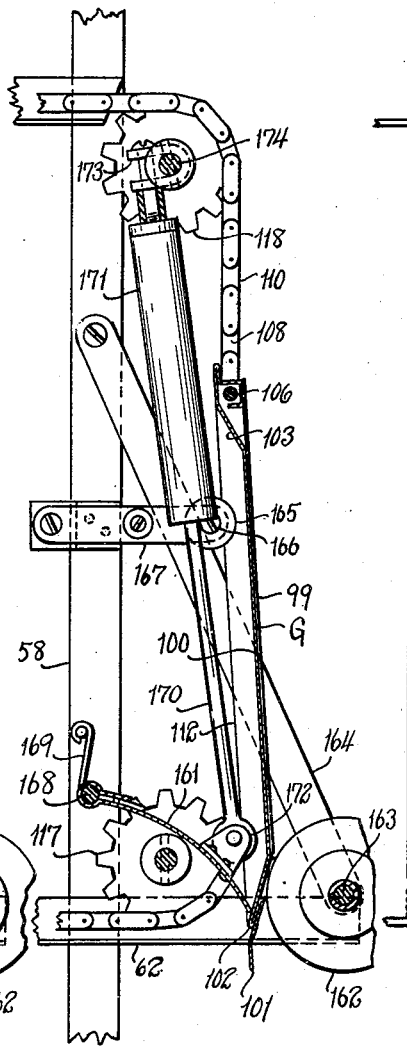
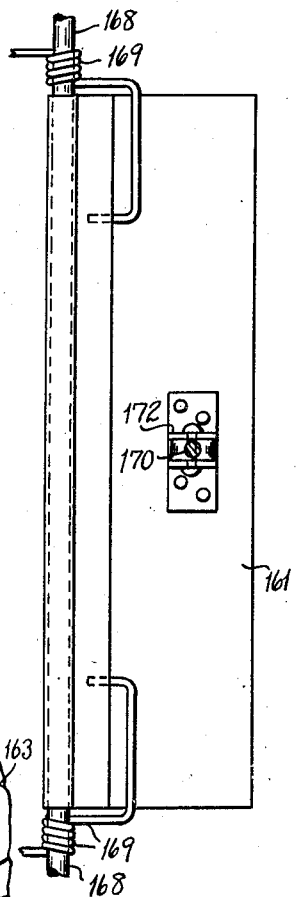

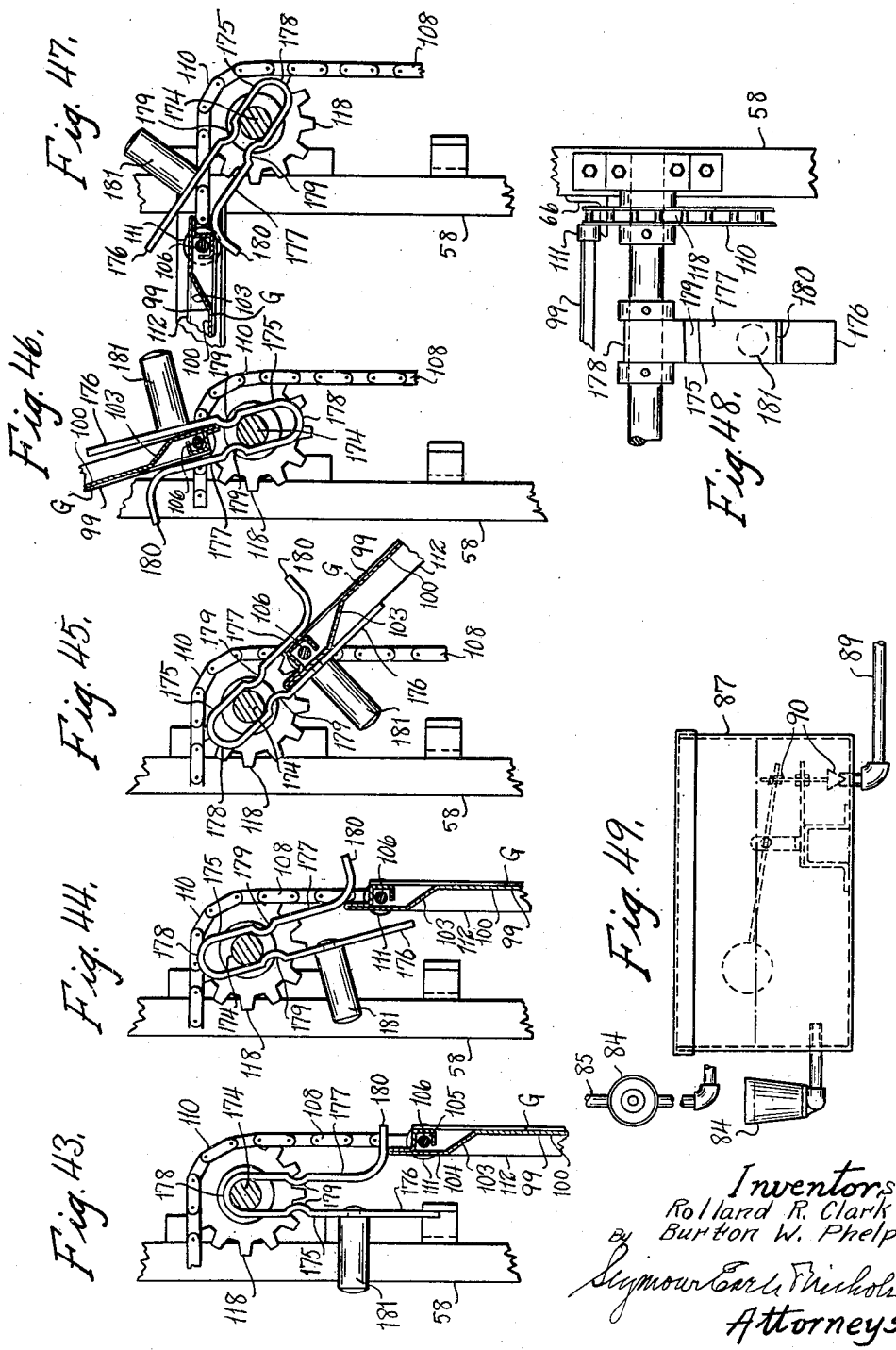

Patented Jan. 9, 1940

2,186,009

UNITED STATES PATENT OFFICE 2,186,009

POULTRY CAGE

Rolland R. Clark, West Haven, and Burton W. Phelps, North Haven, Conn.

Application June 21, 1938, Serial No. 214,876

7 Claims. (Cl. 119—17)

This invention relates to an improvement in poultry cages and particularly to cages arranged in tiers, sometimes referred to as a battery, and designed for laying-hens.

The object of the invention is to provide cages for poultry which may be maintained in a sanitary condition with the expenditure of little labor and expense, and the invention consists in the construction and arrangement of parts as hereinafter described and particularly recited in the claims.

In the drawings:

Fig. 1 is a side view of a poultry cage embodying our invention;

Fig. 2 is a left-hand end view of the same;

Fig. 3 is a right-hand end view of the same;

Fig. 4 is a top plan view partly broken away;

Fig. 5 is a broken sectional view on the line 5—5 of Fig. 4;

Fig. 6 is a sectional view on the line 6—6 of Fig. 4;

Fig. 7 is a fragmentary sectional view on the line 7—7 of Fig. 6;

Fig. 8 is a broken front view of one of the coops;

Fig. 9 is a side view of the same;

Fig. 10 is a perspective view of the door-locking means;

Fig. 11 is a top view of the hinge-bar latch;

Fig. 12 is a front view of the same;

Fig. 13 is a side view of the same;

Fig. 14 is a top view of a feed-box;

Fig. 15 is a perspective view of the same detached;

Fig. 16 is a top plan view of an egg-basket;

Fig. 17 is a side view of the same;

Fig. 18 is a broken sectional view of the same taken on the line 18—18 of Fig. 16;

Fig. 19 is a broken plan view of a basket-support;

Fig. 20 is a side view of the same;

Fig. 21 is a top plan view of a series of pans;

Fig. 22 is a sectional view taken on the line 22—22 of Fig. 21;

Fig. 23 is a broken plan view showing a portion of a pan on an enlarged scale;

Fig. 24 is a sectional view on the line 24—24 of Fig. 23;

Fig. 25 is a sectional view on the line 25—25 of Fig. 23;

Fig. 26 is a broken perspective view of one of the pans detached;

Fig. 27 is a front view of the switch together with its operating mechanism shown in the open-circuit position;

Fig. 28 is a side elevational view thereof;

Fig. 29 is a similar view with the switch-box partly broken away, showing the bar in its depressed or circuit-closing position;

Fig. 30 is a top plan view of the same;

Fig. 31 is a broken plan view showing the spring-latch in position to be moved by the chain;

Fig. 32 is an edge view of the latch;

Fig. 35 is a view similar to Fig. 33 with the parts shown in an intermediate position;

Fig. 36 is a broken plan view thereof;

Fig. 37 is a fragmentary side view of a kicker;

Fig. 38 is a view similar to Fig. 33 with the parts shown at the end of the scraping operation;

Fig. 39 is a broken plan view of the kicker;

Fig. 40 is a broken vertical central sectional view of another pan-scraping mechanism, the parts being shown at the beginning of the scraping operation;

Fig. 41 is a similar view with the parts shown at the end of the scraping operation;

Fig. 42 is a plan view of the scraper detached;

Figure 34:
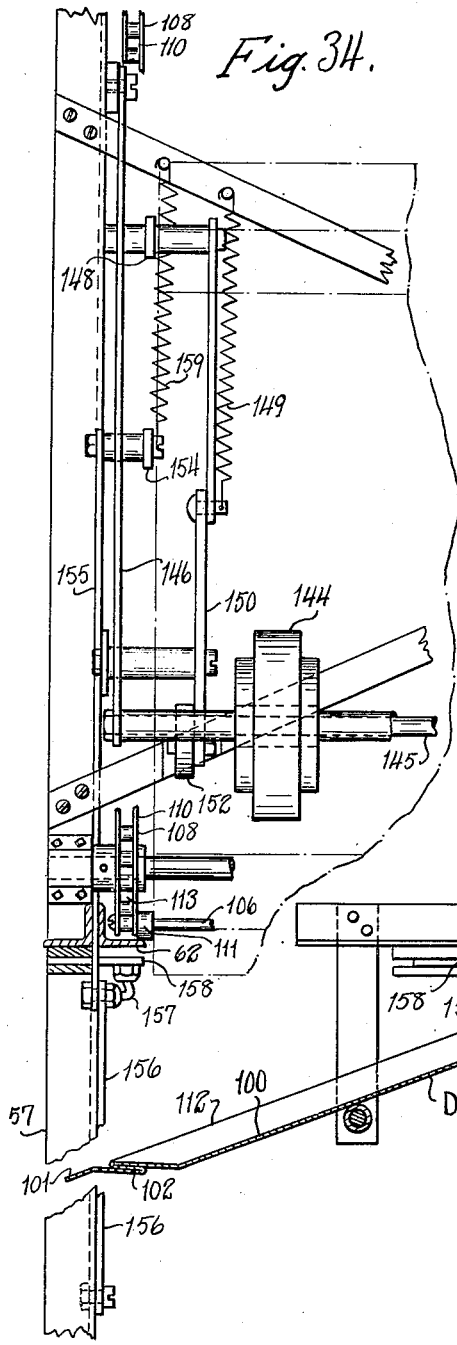
Fig. 34 is a broken end view of the same.

Figs. 43 to 47 inclusive are side views illustrating the pan-turning operation;

Fig. 48 is a face view of one of the pan-turning yokes; and

Fig. 49 is a broken side view of one of the water-tanks detached.

For illustration, we have shown a unit or battery of eighteen coops, ten in the lower tier and eight in the upper tier, but it is obvious that the battery could be extended lengthwise to any desired length, and that another battery might be superimposed upon the first unit, if head-room permits.

A unit comprises corner-posts 55, 56, 57, 58, the posts being connected together at the top by longitudinal metal beams or rails 59 and 60, and above the floor by longitudinal L-rails 61, 62 and at the top the beams on opposite sides are connected by bracing-beams 63, 64.

Midway between the upper rails 59 and 60 and the lower rails 61, 62, longitudinal L-rails 65, 66 are also secured to the corner-posts, and the rails are also supported by uprights 67. Each tier is divided by a series of longitudinal panels 68 of expanded sheet-metal and into coops by transverse panels 69 also of expanded sheet-metal. The method of securing these panels in place is indicated in Fig. 5, in which, as shown, the points 70 of the edges are reversely offset to engage with supporting-rods 71.

The closure for the front of each coop is illustrated in Fig. 8, wherein a door 72 of expanded sheet-metal has its upper edge connected to a hinge-bar 73 and its lower edge with a locking-bar 74. The ends of the hinge-bar extend upwardly and are inset to pass through perforations 75 formed for them in the rails.

The ends 76 of the locking-bar 74 are turned downward and adapted to enter sockets 77 on the uprights 67, from which they may be released by raising the door. To prevent the hinge-bar from turning, we arrange a latch 78 on each side, and these latches are connected by links 79 with a lever 80, as shown in Figs. 11, 12, 13 and 14, so that when the lever is moved to the left, the latches will be disengaged from the hinge-bar 73 and allow the door to be lifted and swung outwardly. In each door is an opening 81 surrounded by a frame 82 with which the edges of the door are connected. In front of each door-opening, a feed-box 83 of any approved construction may be suspended. At the rear of each coop is a drinking-cup 84 for water supplied through pipes 85—85 leading from tanks 87—88 supplied by a feed-pipe 89, and in each tank is a float-valve 90 to control the inlet of water to the tank, so that when the water in the cup lowers to a predetermined point, the float-valve will open to permit the inflow of water until the level of water in the cups again reaches the desired point. This prevents the waste of water and insures a constant supply. As shown in Fig. 6, a tank is arranged for each tier.

In each coop is a floor- or egg-basket 91 (Figs. 16, 17 and 18), also formed from expanded sheet-metal. This basket projects forwardly below the door, and at the front of each basket is a cushion 92 of sponge rubber or other suitable material, held in place by turning the forward end 93 and side edges 94 of the basket upward, and against which cushion an egg may roll, the floor being inclined downwardly from the rear of the coop. The turned-up inner ends of the basket engage with the lower edges of the longitudinal panels 68, with which they are held in place by longitudinally-arranged rods 95, and are further supported by rods 96 suspended by yokes 97 from transverse brace-rods 98.

Below each egg-basket is a pan 99 formed from flat sheet-metal and comprising a central portion 100, a forwardly-and-upwardly-projecting lip 101 which is reinforced transversely by making a fold 102. At the rear, the pan has an incline 103 from which is a rear extension 104, and the rear edge is turned forwardly, thence downwardly, forwardly and upwardly, to form a passage 105 for a shaft 106. In the ends of the shaft, screw-studs 107 are mounted. The studs extend through links 108 of endless chains 109, 110 and through rollers 111, and the rollers 111 ride upon the rails 61, 62 and 65, 66. At each side of the pan is a wall 12.

The chains pass over sprocket-wheels 113, 114 and 115, 116 at each side of the left end of the device and over similar sprocket-wheels 117, 118 and 119, 120 at the right end. To move the chains, we prefer to employ an electric motor 121, the driving-shaft 122 of which transmits motion by a worm 123 meshing with a work-wheel 124 which drives through a chain 125, a sprocket-wheel 126 and the shaft 127 of the chain-sprocket 119, so that when the motor is running the chains will be moved. If desired, a sprocket-wheel 128 may be arranged to engage the chain 125 and a crank 129 fixed to the shaft 130 of the wheel 128, so that the chain may be moved by hand.

If an electric motor is employed, a switch 131 will be employed, including a vertically-movable double switch-bar 132 in which is mounted a switch-operator 133 through which the switch-control-lever 134 extends. The bar extends through plates 135 and 136 secured to the switch-box 137 by which it is supported in a vertical position, and connected to the upper end is a spring 138, the tendency of which is to raise the bar. In the edges of the bars are notches 139 to be entered by a spring-latch 140 when the switch-bar is depressed, this lever having a finger 141 to be engaged by a lug 142 mounted on the chain.

When the switch-bar is pushed downward, the circuit will be closed. Then when the chain has completed one cycle, the lug 142 will move the lever 140 and release the switch-bar to move upward under pressure of the spring 138 and open the circuit, thus stopping the movement of the chains at the desired time.

When the chains are at rest, a pan will be located beneath each egg-basket, through which droppings may pass onto the pans, and three pans at the left and one at the right not in use. For convenience and clearness of description, we refer to the pan below the coop in the upper tier at left as A, the ones in advance of A as B, C and D; the pan under the coops in the lower tier at the left as E; the pan under the coops in the lower tier at the right as F; the one in advance of it as G.

Figure 33:
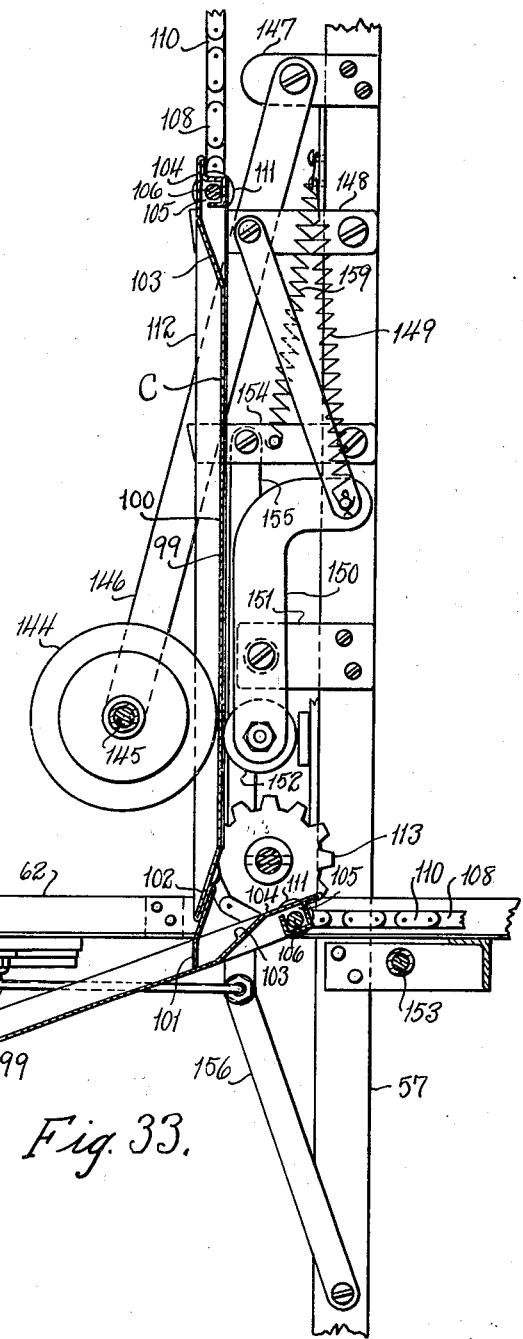
Fig. 33 is a broken vertical central sectional view of one of the pan-scraping mechanisms, the parts being shown at the beginning of the scraping operation.

When the chains move, the pan A is projected outward to the position of B and then turns downward and passes to the position of pan C in rear of comparatively-heavy rollers 144 mounted on a shaft 145 at the lower ends of arms 146 which are pivoted at their upper ends to brackets 147. As the pan C reaches a vertical position, as shown in Fig. 6, the lip 101 comes in contact with the surface of the pan D, so that as the pan D moves rearward, its surface will be scraped by the said lip. As the lip 101 of C contacts with the surface of the pan D, its roller 111 engages with a pivoted lever 148 connected by a link 149 with the upper end of a bell-crank lever 150 pivoted to a fixed bearing 151 and moves a roller 152 mounted at the lower end of the lever 150 against the under side of the pan C so as to swing the said pan outwardly about its shaft 106, thereby scraping the edge 101 across the face of the pan D from the position shown in Fig. 33 to a point beyond the position shown in Fig. 35. Continued downward travel of the pan C causes the rollers 111 to pass by the lever 148 to permit the latter to be returned to its normal position by a spring 149. As the pan D moves rearward, it will be supported by a roller 153.

As the lip 101 of the pan C approaches the lip of the pan D, the roller 111 of the pan C strikes a pivoted lever 154 which is connected by toggle-links 155 and 156 with one end of a bar 157, the other end of the bar being pivotally connected with a kicker 158 so as to raise the lip of the pan C out of contact with the lip of the pan D. As the roller 111 of the pan C passes the lever 154, that lever will be raised to its normal position by a spring 159. As the pan D moves rearward to the position of pan E, the pan C reaches a position formerly occupied by the pan D, to be scraped by the pan B. When the pan F moves rearward, its forward end drops down upon a support 160 and as it is carried upward, its rear end engages with a scraper 161 which is raised thereby. The pan is held in contact with the scraper by rolls 162 mounted on a shaft 163 supported by arms 164 pivotally connected with the rear corner-posts 56, 58, and to guide the pans, rollers 165 are mounted on studs 166 supported by brackets 167 mounted on the rear posts.

The scraper is mounted on a rod 168, and springs 169 are provided which tend to force the outer edge of the scraper downward. To control the upward movement of the scraper, the piston-rod 170 of a pneumatic check 171 is pivotally mounted between lugs 172 on the upper face of the scraper, the cylinder of the check being supported by a yoke 173 mounted on the shaft 174 of the sprocket-wheels 118, 120. When the lip of the pan passes the scraper and releases the same, it will move downward as the pan rises so as to scrape the pan and remove any material not removed by the scraper at the forward end. Each pan is, therefore, scraped twice.

To turn the pan so that it will enter the upper tier right-side-up, yokes 175 are suspended on the shaft 174 (see Figs. 43 to 47 inclusive). These yokes comprise fingers 176, 177 united by a bend 178, both fingers formed with inwardly-extending bends forming ribs 179 to prevent detachment from the shaft. The end 180 of the finger 177 is curved outward to form a guide and attached to the finger 176 is a weight 181. As the rear end of the pan moves upward, it will enter the yokes and as the chain advances, its lip-end will be turned outward and upward and then downward so that its lip will rest upon the hinge-end of the preceding pan, and when it moves out of the yoke, the weight will return the yoke to its position of rest, ready to operate upon the next succeeding pan.

The coops in the upper tier are covered by plates 182 of expanded flat sheet-metal unless another unit is mounted upon the first unit.

It will thus be seen that we have produced a battery of poultry cages that are sanitary, solid in construction and which can be formed, operated and maintained at a very low cost.

We claim:

1. A poultry cage comprising a frame, horizontal rails supported thereby, a series of pans, sprocket-chains with which said pans are connected, an electric motor for moving said chains, a switch controlling said motor, said switch including a vertically movable switch-bar, a spring tending to raise said bar, means for holding said bar in a depressed position, and a lug carried by one of said chains and adapted to release said bar upon the completion of one cycle of movement.

2. A poultry cage comprising a frame, horizontal rails supported thereby, a series of pans supported by said rails and each formed with a lip at its forward end, two endless sprocket-chains with which said pans are connected, the said lips adapted to rest upon the rear end of the next-preceding pan, and means for causing the lip of one pan to scrape the upper surface of the preceding pan.

3. A poultry cage comprising a frame, horizontal rails supported thereby, a series of pans supported by said rails and each formed with a lip at its forward end, two endless sprocket-chains with which said pans are connected, the said lips adapted to rest upon the rear end of the next-preceding pan, means for causing the lip of one pan to scrape the upper surface of the preceding pan, and a kicker to raise the lip of the first pan out of engagement with the scraped pan.

4. A two tier poultry cage comprising a frame, horizontal rails supported thereby, a series of pans below each tier, sprocket-chains with which said pans are connected, means for moving said chains, and means for reversing the position of the pans as they pass from the lower tier to the upper tier.

5. A two tier poultry cage comprising a frame, horizontal rails supported thereby, a series of pans below each tier, sprocket-chains with which said pans are connected, means for moving said chains, means including a pair of yokes for reversing the position of the pans as they pass from the lower tier to the upper tier, and a scraper at the left positioned to scrape the surface of a pan as it leaves the lower tier.

6. A two tier poultry cage comprising a frame, horizontal rails supported thereby, a series of pans below each tier, sprocket-chains with which said pans are connected, means for moving said chains, means including a pair of yokes for reversing the position of the pans as they pass from the lower tier to the upper tier, and a spring-tensioned scraper at the left positioned to scrape the surface of a pan as it leaves the lower tier.

7. A two tier poultry cage comprising a frame, horizontal rails supported thereby, a series of pans below each tier, sprocket-chains with which said pans are connected, means for moving said chains, means including a pair of yokes for reversing the position of the pans as they pass from the lower tier to the upper tier, a spring-tensioned scraper at the left positioned to scrape the surface of a pan as it leaves the lower tier, and a pneumatic check for said scraper.

ROLLAND R. CLARK.
BURTON W. PHELPS.